United States Patent
Xu et al.

(10) Patent No.: US 12,083,602 B2
(45) Date of Patent: Sep. 10, 2024

(54) PREPARATION METHOD OF TITANIUM ALLOY POWDERS

(71) Applicant: SOUTHWEST JIAOTONG UNIVERSITY, Chengdu (CN)

(72) Inventors: Yi Xu, Chengdu (CN); Chengyang Zhang, Chengdu (CN); Siyi He, Chengdu (CN); Hui Chen, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 18/630,802

(22) Filed: Apr. 9, 2024

(65) Prior Publication Data

US 2024/0253122 A1  Aug. 1, 2024

Related U.S. Application Data

(63) Continuation of application No. PCT/CN2022/122964, filed on Sep. 30, 2022.

(30) Foreign Application Priority Data

Nov. 19, 2021 (CN) .......................... 202111374069.7

(51) Int. Cl.
*B22F 9/14* (2006.01)
*C22C 1/02* (2006.01)
(Continued)

(52) U.S. Cl.
CPC .................. *B22F 9/14* (2013.01); *C22C 1/02* (2013.01); *C22C 14/00* (2013.01); *C22F 1/183* (2013.01);
(Continued)

(58) Field of Classification Search
None
See application file for complete search history.

(56) References Cited

U.S. PATENT DOCUMENTS

| 5,989,491 A | 11/1999 | Isomoto et al. |
| 2019/0381564 A1* | 12/2019 | Barnes ................... C22C 19/07 |
| 2021/0180165 A1 | 6/2021 | Pasebani et al. |

FOREIGN PATENT DOCUMENTS

| CN | 105689730 A | 6/2016 |
| CN | 106853535 A | 6/2017 |

(Continued)

OTHER PUBLICATIONS

English translation of CN 106853535 A (originally published Jun. 16, 2017), obtained from PE2E search.*

(Continued)

*Primary Examiner* — George Wyszomierski

(57) ABSTRACT

A preparation method of Yttrium oxide dispersed and strengthened titanium alloy powders. The method includes following steps: mixing alloying elements according to alloy element ratios of: 0.1 wt % to 1.0 wt % Y, 5.5 wt % to 6.8 wt % Al, 3.5 wt % to 4.5 wt % V, Ti as balance, preparing alloy ingots by vacuum smelting process, and performing forging and rolling process; performing mechanical treatment for forged and rolled alloy ingots, to obtain alloy rods that meet size requirement of plasma rotating electrode process; preparing titanium alloy powders based on alloy rods by the plasma rotating electrode process; preparing parameters are: rotating speed of the alloy rods is 25000 r/min to 35000 r/min, a feeding speed of the alloy rods is 1.0 mm/s to 2.0 mm/s, power of the plasma gun is 60 kw to 140 kw, a temperature of the inert gas is 200° C. to 400° C., oxygen content of atomization chamber not greater than 100 ppm.

8 Claims, 4 Drawing Sheets

TC4 SEM 200x    TC4-0.1Y SEM 200x
TC4-0.3Y SEM 200x    TC4-0.5Y SEM 200x

(51) Int. Cl.
*C22C 14/00* (2006.01)
*C22F 1/18* (2006.01)

(52) U.S. Cl.
CPC ..... *B22F 2202/13* (2013.01); *B22F 2301/205* (2013.01); *B22F 2998/10* (2013.01); *B22F 2999/00* (2013.01)

(56) References Cited

FOREIGN PATENT DOCUMENTS

| | | |
|---|---|---|
| CN | 107824771 A | 3/2018 |
| CN | 110524001 A | 12/2019 |
| CN | 110625112 A | 12/2019 |
| CN | 112469520 A | 3/2021 |
| CN | 113059172 A | 7/2021 |
| GB | 201806744 A | 6/2018 |
| KR | 20200019387 A | 2/2020 |

OTHER PUBLICATIONS

English translation of CN 113059172 A (originally published Jul. 2, 2021), obtained from PE2E search.*
Internation Search Report of PCT/CN2022/122964, Mailed Dec. 8, 2022.
Liu Jun et al., "Preparation of TC4 alloy powder by plasma rotating electrode atomization", Ningxia Engineering Technology, vol. 15, No. 4, Dec. 15, 2016, pp. 340-342.

* cited by examiner

TC4 SEM 5000x

TC4-0.1Y SEM 5000x

TC4-0.3Y SEM 5000x

TC4-0.5Y SEM 5000x

PREPARATION METHOD OF TITANIUM ALLOY POWDERS

CROSS REFERENCE TO RELATED APPLICATIONS

This application is a national stage filing under 35 U. S. C. § 371 of international application number PCT/CN2022/122964, filed Sep. 30, 2022, which claims priority to Chinese patent application No. 202111374069.7, filed Nov. 19, 2021. The contents of these applications are incorporated herein by reference in their entirety.

TECHNICAL FIELD

The present disclosure relates to the technical field of preparing titanium alloy powders, in particular to a preparation method of titanium alloy powders.

BACKGROUND

Plasma atomization technology can produce micron-scale powder materials, theoretically, can produce all kinds of materials, including high-temperature metals, such as tungsten, molybdenum, niobium, tantalum, as well as some ceramic materials, including aerospace, military, vehicle, medical and other technical fields.

The current additive manufacturing powders can hardly meet the large-scale application of additive manufacturing technology in terms of powder spherical, powder purity, powder uniformity, powder loose loading density and powder self-sufficiency rate. High-end titanium alloy powders is basically dependent on importing, the cost is high (up to 4000 yuan/kg to 5000 yuan/kg), domestic titanium alloy powder has less quantity and poor quality, it is difficult to meet the current demand. At present, the development and application of titanium alloy powder in special fields are still in the initial stage. How to further improve the quality and performance of high-end titanium alloy powders is worth further study and exploration.

SUMMARY

The present disclosure provides a preparation method of titanium alloy powders, by performing several times of vacuum smelting process of yttrium (Y) melting into titanium alloy, after forging and rolling process, preparing titanium alloy powders by plasma rotary electrode, titanium alloy powders have excellent properties such as low oxygen content, ultra-high spherical shape, high strength and high hardness.

The preparation method of titanium alloy powders, including following steps of:

S1, mixing alloying elements according to alloy element ratios of: 0.1 wt % to 1.0 wt % Y, 5.5 wt % to 6.8 wt % Al, 3.5 wt % to 4.5 wt % V, and Ti as balance, preparing alloy ingots by a vacuum smelting process, and performing a forging and rolling process for the alloy ingots to obtain forged and rolled alloy ingots, where, a temperature of the forging and rolling process is 800° C. to 1100° C., the forging and rolling process lasts for 80 min to 140 min, and a deformation degree of the alloy ingots during the forging and rolling process is 30% to 50%;

S2, performing a mechanical treatment for the forged and rolled alloy ingots, to obtain alloy rods that meet a size requirement of a plasma rotating electrode process;

S3, preparing titanium alloy powders based on the alloy rods by the plasma rotating electrode process;

preparing parameters of the plasma rotating electrode process are: a rotating speed of the alloy rods is 25000 r/min to 35000 r/min, a feeding speed of the alloy rods is 1.0 mm/s to 2.0 mm/s, a power of the plasma gun is 60 kw to 140 kw, adopting inert gas as a protective gas during a powder making process, and a temperature of the inert gas is 200° C. to 400° C.; detecting an oxygen content of the atomization chamber to keep the oxygen content of the atomization chamber not greater than 100 ppm.

Furthermore, in S1 mixing alloying elements according to the alloy element ratios of: 0.3 wt % to 0.5 wt % Y; 5 wt % to 6.2 wt % Al; 3.8 wt % wt % to 4.2 wt % V, and Ti as balance, preparing alloy ingots by the vacuum smelting process, and performing a forging and rolling process for the alloy ingots.

Furthermore, in S1, the Y is powders of simple substance, and a particle size of the Y is not greater than 40 μm.

Furthermore, in S1, the vacuum smelting process is a vacuum arc self-consuming smelting process, or the vacuum smelting process is a vacuum induction melting process; the vacuum smelting process is performed not less than two times;

Furthermore, in S2, a length of the alloy rods is 150 mm to 200 mm, a diameter of the ally rods is 30 mm, and a surface roughness of the alloy rods is not greater than 1.6 μm.

Furthermore, the preparing parameters of the plasma rotating electrode process are: the rotating speed of the alloy rods of 30000 r/min to 35000 r/min, the feeding speed of the alloy rods is 1.5 mm/s to 2.0 mm/s, and the power of the plasma gun is 100 kw to 120 kw.

Furthermore, in S3 during the process of preparing Yttrium oxide dispersed and strengthened titanium alloy powders by the plasma rotating electrode process, the temperature of the inert gas is 200° C. to 280° C.; the oxygen content of the atomization chamber not greater than 50 ppm.

Furthermore, the step of preparing titanium alloy powders based on the alloy rods by the plasma rotating electrode process includes:

S31, loading the alloy rods into a rotatable feeding device, vacuuming an atomization chamber until a vacuum degree of the atomization chamber reaches $1 \times 10^{-3}$ Pa to $1 \times 10^{-2}$ Pa, and filling an inert gas into the atomization chamber until a pressure of the atomization chamber reaches $1.6 \times 10^5$ Pa to $1.8 \times 10^5$ Pa, and detecting an oxygen content of the atomization chamber to keep the oxygen content of the atomization chamber not greater than 100 ppm;

S32, starting a cooling system to control a temperature of the inert gas within 200° C. to 400° C.;

S33, starting the rotatable feeding device and a power supply of a plasma gun, to perform an atomizing process, and to obtain the titanium alloy powders, where a plasma arc is generated between the alloy rods and the plasma gun, and under a combining action of a centrifugal force and a surface tension, the alloy rods are melted and changed into droplets, and the droplets are solidified into the titanium alloy powders, after the titanium alloy powders completely cooled down, the titanium alloy powders are vacuum packaged and stored.

Furthermore, a spindle current of the plasma rotating electrode of the rotating feed device is 600 A to 800 A, and the working current of the plasma gun is 80 A to 120 A.

Furthermore, the spindle current of the plasma rotating electrode of the rotating feed device is 600 A to 700 A, and the working current of the plasma gun is 100 A to 120 A.

The preparation method of the present disclosure can obtain ultra-high sphericity, high strength and high hardness titanium alloy powders, principle is as follows:

there is an empirical formula between a metal surface tension and a melting point: $\sigma=3.5\,T_m/V^{2/3}$, Where $\sigma$ is the metal liquid surface tension, and $T_m$ is the metal melting point: $V^{2/3}$ is the surface area of the metal atoms. It is known that when the metal atomic surface area is certain, reducing the metal melting point can reduce the surface tension of the liquid metal solution. The present disclosure uniformly introduces yttrium into the titanium alloy by performing several times of vacuum smelting process, so that the melting point of the alloy powders will be reduced, that is, the addition of Y atoms reduces the surface tension of the alloy melt fluid.

When the plasma rotating electrode process is atomized, the droplets generated by the alloy flow are cooled and solidified into powders during a subsequent centrifugal motion. The added rare earth element Y generates $Y_2O_3$ in the titanium alloy matrix, Thus reducing the oxygen content in the titanium alloy powders. As a heterogeneous nucleus, it promotes the growth of grains, and the overall grain size is refined. The reinforced phase yttrium oxide in the titanium alloy powder is evenly distributed in the matrix, and the dispersion enhancement makes the strength and hardness of the titanium alloy powders improved. And with the decrease of surface tension, the melt is more prone to centrifugal movement and cooling and solidification, promoting the distribution of yttrium oxide, the diffusion distribution is more uniform.

The dispersion enhancement refers to a strengthening method of a material by adding hard particles to a uniform material. Metal materials are reinforced by using an ultra-fine second phase (strengthening phase) that is insoluble in the base metal. In order to achieve uniform distribution of the second phase in the base metal, powder metallurgy is commonly used. The second phase is generally high melting point oxides, carbides, and nitrides, and its strengthening effect can be maintained up to higher temperatures, in the embodiments of the present disclosure the second phase is Yttrium oxide.

Compared with the prior art, the beneficial effects of the present disclosure are:

1. in the present disclosure, by adding yttrium element during the preparation process, and Y reacts in situ with the oxygen of matrix to generate yttrium oxide with nanoscale and to reduce the oxygen content of the titanium alloy powder;
2. The reinforcing phase yttrium oxide generated in the titanium alloy powder is evenly distributed in the matrix, and the dispersion reinforcement improves the strength and hardness of the alloy powder, which further improves the application field of the titanium alloy powder.
3. The preparation process of titanium alloy powders is simple and can be completed on the existing atomization production line without any adjustment. Therefore, the present invention has a good general application prospect.

DETAILED DESCRIPTION OF THE EMBODIMENTS

Figure 1:
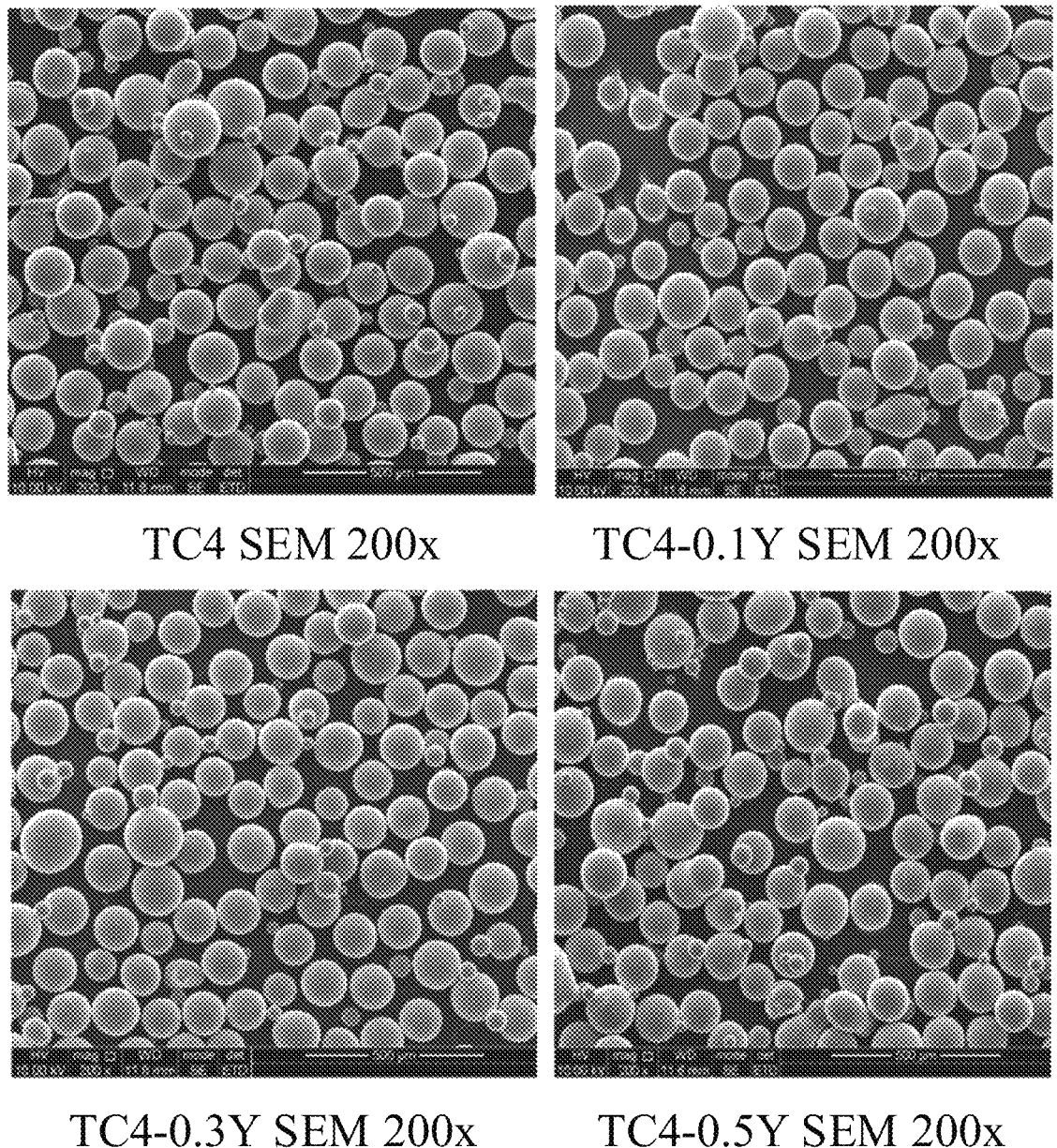
FIG. 1 is a scanning electron microscope (SEM) at 200× of titanium alloy powders prepared in embodiments of the present disclosure.

Plasma rotating electrode comminuting process (PREP) is a spherical powders preparation process, the PREP makes metal or alloy into bars and use plasma to heat the bars. At the same time, the bars rotate at high speed, relying on centrifugal force to refine molten droplets. Solidify in an inert gas environment and spheroidize to form powder under surface tension.

The equipment used in the plasma rotating electrode comminuting process is a plasma rotating electrode equipment. The plasma rotating electrode equipment includes a atomization chamber, a plasma gun, a rotatable feeding device, a motor room, a vacuum system, a gas system, a cooling system and a powder collection system, a power supply system and an operation room. The atomization chamber is configured to melt high-speed rotating electrode rods by a high-temperature plasma arc, and to form a molten pool. The liquid metal film is thrown out and atomized into small droplets under the action of centrifugal force. During the rapid solidification process, the small droplets cool down and form spherical powder under the action of surface tension. The plasma gun includes a cerium tungsten cathode and a water-cooled copper anode for melting electrode rods. The rotatable feeding device is configured for high-speed rotation and feeding of electrode rods. The motor room includes a speedometer, a frequency converter, and an electric motor, the motor room includes for rotating electrode rods. The vacuum system includes a Roots pump, a slide valve pump, a diffusion pump, a maintenance pump, a testing instrument, etc., and the vacuum system is used for vacuuming. The gas system is used to supply inert gas that forms plasma to the plasma generator during a powder making process. The cooling system is used for rapidly cooling of components such as plasma guns. The powder collection system is used for collecting and discharging titanium alloy powders.

A preparation method of titanium alloy powders, includes following steps of:

S1, mixing alloying elements according to alloy element ratios of: 0.1 wt % to 1.0 wt % Y, 5.5 wt % to 6.8 wt % Al, 3.5 wt % to 4.5 wt % V, and Ti as balance, preparing alloy ingots by a vacuum smelting process, and performing a forging and rolling process for the alloy ingots to obtain forged and rolled alloy ingots;

S2, performing a mechanical treatment for the forged and rolled alloy ingots, to obtain alloy rods that meet a size requirement of a plasma rotating electrode process;

S3, preparing titanium alloy powders based on the alloy rods by the plasma rotating electrode process.

preparing parameters of the plasma rotating electrode process are: a rotating speed of the alloy rods is 25000 r/min to 35000 r/min, a feeding speed of the alloy rods is 1.0 mm/s to 2.0 mm/s, a power of the plasma gun is 60 kw to 140 kw, adopting inert gas as a protective gas during a powder making process, and a temperature of the inert gas is 200° C. to 400° C.; detecting an oxygen content of the atomization chamber to keep the oxygen content of the atomization chamber not greater than 50 ppm.

Where, in S1, the alloy element ratios of alloying elements are as follow: 0.3 wt % to 0.5 wt % Y, 5.8 wt % to 6.2 wt % Al, 3.8 wt % to 4.2 wt % V, and Ti as balance. Adopting a vacuum smelting process to prepare alloy ingots.

Preferably, in S1, the Y is powders of a simple substance, and a particle size of the Y is not greater than 40 μm.

Preferably, in S1, the vacuum smelting process is a vacuum arc self-consuming smelting process, or the vacuum smelting process is a vacuum induction melting process, the vacuum smelting process is performed not less than two times. a temperature of the forging and rolling process is 800° C. to 1100° C., an the forging and rolling process lasts for 80 min to 140 min, and a deformation degree of the alloy ingots during the forging and rolling process is 30% to 50%. More preferably, the temperature of the forging and rolling process is 800° C. to 960° C., the forging and rolling process lasts for 80 min to 100 min.

Preferably, in S2, a length of the alloy rods is 150 mm to 200 mm, a diameter of the ally rods is 30 mm, and a surface roughness Ra of the alloy rods is not greater than 1.6 μm.

More preferably, the preparing parameters of the plasma rotating electrode process in S3 are: the rotating speed of the alloy rods of 30000 r/min to 35000 r/min, the feeding speed of the alloy rods is 1.5 mm/s to 2.0 mm/s, and the power of the plasma gun is 100 kw to 120 kw.

Preferably, in S3, during the process of preparing nano Yttrium oxide dispersed and strengthened titanium alloy powders by the plasma rotating electrode process, a temperature of the inert gas is 200° C. to 280° C.; the oxygen content of the atomization chamber is not greater than 50 ppm.

Preferably, the step of preparing titanium alloy powders based on the alloy rods by the plasma rotating electrode process includes:

S31, loading the alloy rods into a rotatable feeding device, vacuuming an atomization chamber until a vacuum degree of the atomization chamber reaches $1\times10^{-3}$ Pa to $1\times10^{-2}$ Pa, and filling an inert gas into the atomization chamber until a pressure of the atomization chamber reaches $1.6\times10^3$ Pa to $1.8\times10^5$ Pa, and detecting an oxygen content of the atomization chamber to keep the oxygen content of the atomization chamber is not greater than 100 ppm;

S32, starting a cooling system to control a temperature of the inert gas within 200° C. to 400° C.;

S33, starting the rotatable feeding device and a power supply of a plasma gun, to perform an atomizing process, and to obtain the titanium alloy powders, where a plasma arc is generated between the alloy rods and the plasma gun, and under a combining action of a centrifugal force and a surface tension, the alloy rods are melted and changed into droplets, and the droplets are solidified into the titanium alloy powders, after the titanium alloy powders completely cooled down, the titanium alloy powders are vacuum packaged and stored.

More preferably, a spindle current of the plasma rotating electrode of the rotating feed device is 600 A to 800 A, and the working current of the plasma gun is 80 A to 120 A.

A First Comparative Embodiment

A preparation method of titanium alloy powders, includes following steps:

S1, mixing alloying elements according to alloy element ratios of: 6 wt % Y, 4 wt % Al, and Ti as balance, (recording as Ti6Al4V, or TC4), preparing alloy ingots by a vacuum smelting process, and performing a forging and rolling process for the alloy ingots;

the vacuum smelting process is performed not less than two times, the temperature of the forging and rolling process is 960° C., the forging and rolling process lasts for 100 min, the deformation degree of the alloy ingots during the forging and rolling process is 50%.

S2, performing a mechanical treatment for the forged and rolled alloy ingots, to obtain alloy rods that meet a size requirement of a plasma rotating electrode process; a length of the alloy rods is 160 mm, a diameter of the ally rods is 30 mm, a surface roughness Ra of the alloy rods is not greater than 1.6 μm.

S3, preparing titanium alloy powders based on the alloy rods by the plasma rotating electrode process, includes:

S31, loading the alloy rods into a rotatable feeding device, vacuuming an atomization chamber until a vacuum degree of the atomization chamber reaches $8.6\times10^{-3}$ Pa, and filling an inert gas into the atomization chamber until a pressure of the atomization chamber reaches $1.6\times10^5$ Pa, and detecting an oxygen content of the atomization chamber to keep the oxygen content of the atomization chamber not greater than 50 ppm;

S32, starting a cooling system to control a temperature of the inert gas keeps at 280° C.;

S33, starting the rotatable feeding device and a power supply of a plasma gun, to perform an atomizing process, and to obtain the titanium alloy powders, where a plasma arc is generated between the alloy rods and the plasma gun, and under a combining action of a centrifugal force and a surface tension, the alloy rods are melted and changed into droplets, and the droplets are solidified into the titanium alloy powders, after the titanium alloy powders completely cooled down, the titanium alloy powders are vacuum packaged and stored.

preparing parameters of the plasma rotating electrode process are: a rotating speed of the alloy rods is 30000 r/min, a feeding speed of the alloy rods is 1.5 mm/s, a power of the plasma gun is 120 kw, a spindle current of the plasma rotating electrode of the rotating feed device is 600 A, the working current of the plasma gun is 100 A.

A First Embodiment

A preparation method of titanium alloy powders, includes following steps:

S1, mixing alloying elements according to alloy element ratios of: 0.1 wt % Y, 6.01 wt % Al, 3.95 wt % V, and Ti as balance, (recording as Ti6Al4V-0.1Y, or TC4-0.1Y), preparing alloy ingots by a vacuum smelting process, and performing a forging and rolling process for the alloy ingots; the Y is powders of simple substance, and a particle size of the Y is not greater than 40 μm;

the vacuum smelting process is performed not less than two times, the temperature of the forging and rolling process is 960° C., the forging and rolling process lasts for 100 min, the deformation degree of the alloy ingots during the forging and rolling process is 50%.

S2, performing a mechanical treatment for the forged and rolled alloy ingots, to obtain alloy rods that meet a size requirement of a plasma rotating electrode process; a length of the alloy rods is 160 mm, a diameter of the ally rods is 30 mm, a surface roughness Ra of the alloy rods is not greater than 1.6 μm.

S3, preparing titanium alloy powders based on the alloy rods by the plasma rotating electrode process, includes:

S31, loading the alloy rods into a rotatable feeding device, vacuuming an atomization chamber until a vacuum degree of the atomization chamber reaches $8.6 \times 10^{-3}$ Pa, and filling an inert gas into the atomization chamber until a pressure of the atomization chamber reaches $1.6 \times 10^5$ Pa, and detecting an oxygen content of the atomization chamber to keep the oxygen content of the atomization chamber not greater than 50 ppm;

S32, starting a cooling system to control a temperature of the inert gas keeps at 280° C.;

S33, starting the rotatable feeding device and a power supply of a plasma gun, to perform an atomizing process, and to obtain the titanium alloy powders, where a plasma arc is generated between the alloy rods and the plasma gun, and under a combining action of a centrifugal force and a surface tension, the alloy rods are melted and changed into droplets, and the droplets are solidified into the titanium alloy powders, after the titanium alloy powders completely cooled down, the titanium alloy powders are vacuum packaged and stored.

preparing parameters of the plasma rotating electrode process are: a rotating speed of the alloy rods is 30000 r/min, a feeding speed of the alloy rods is 1.5 mm/s, a power of the plasma gun is 120 kw, a spindle current of the plasma rotating electrode of the rotating feed device is 600 A, the working current of the plasma gun is 100 A.

A Second Embodiment

The technical solutions of the second embodiment is basically the same as that of the first embodiment, with the only difference being that alloy element ratios of alloying elements are as follow: 0.304 wt % Y, 5.95 wt % Al, 3.99 wt % V, and Ti as balance, (recording as Ti6Al4V-0.3Y, or TC4-0.3Y).

A Third Embodiment

The technical solutions of the third embodiment is basically the same as that of the first embodiment, with the only difference being that alloy element ratios of alloying elements are as follow: 0.505 wt % Y, 5.96 wt % Al, 4.04 wt % V, and Ti as balance, (recording as Ti6Al4V-0.5Y, or TC4-0.5Y).

FIG. 1 is a scanning electron microscope (SEM) at 200× of titanium alloy powders prepared in the first comparative embodiment, the first embodiment, the second embodiment and the third embodiment of the present disclosure; Through observing the SEM, it was found that the powders were highly regular, with a smooth and round surface and few satellite balls present. The overall sphericity of powder particles is relatively high, with fewer other irregular particles.

Figure 2:
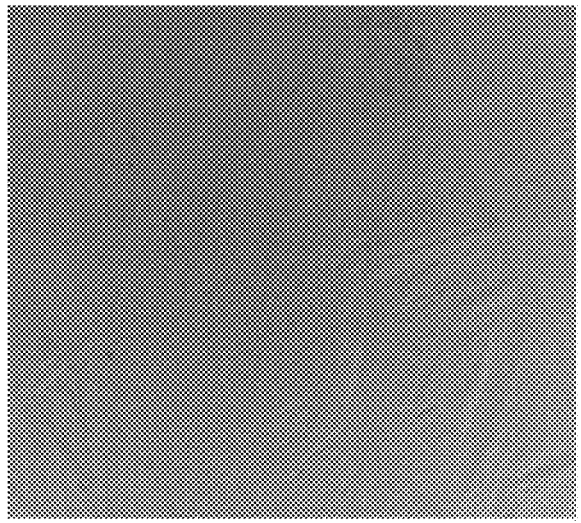
FIG. 2 a scanning electron microscope (SEM) at 5000× of titanium alloy powders prepared in embodiments of the present disclosure.
Figure 2:
Figure 2:
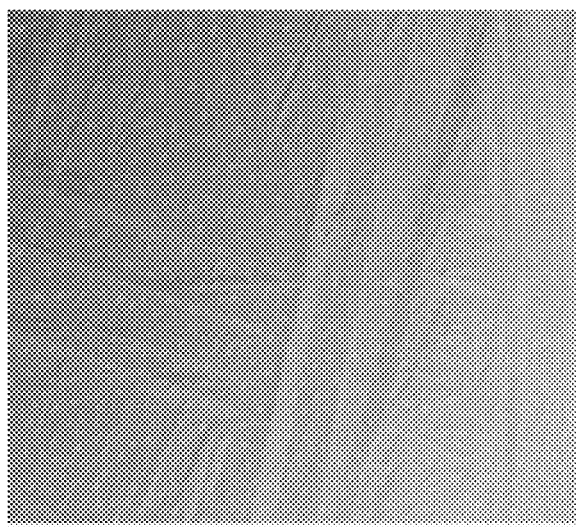
Figure 2:
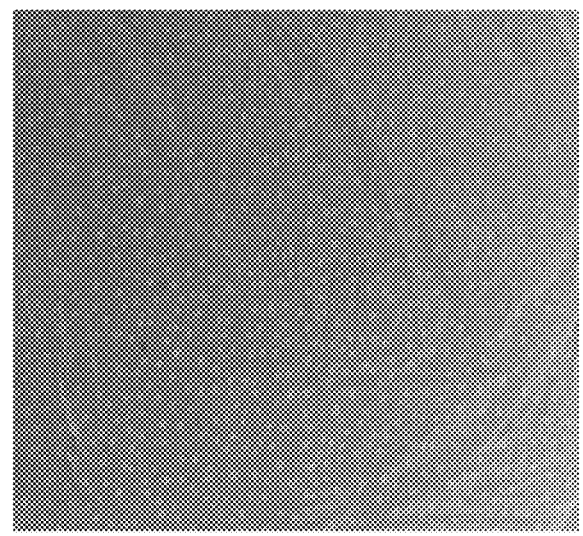

FIG. 2 a scanning electron microscope (SEM) at 5000× of titanium alloy powders prepared in the first embodiment, the second embodiment and the third embodiment of the present disclosure; with reference of FIG. 2, it can be seen that no dispersion phase yttrium oxide was found in the titanium alloy powders prepared in the first comparative embodiment. A very small amount of dispersion phase yttrium oxide was found in the titanium alloy powders prepared in the first embodiment, a significant dispersed phase yttrium oxide was found in the titanium alloy powders prepared in the second embodiment, and a large amount of dispersion phase yttrium oxide was found in the titanium alloy powders prepared in the third embodiment.

Figure 3:
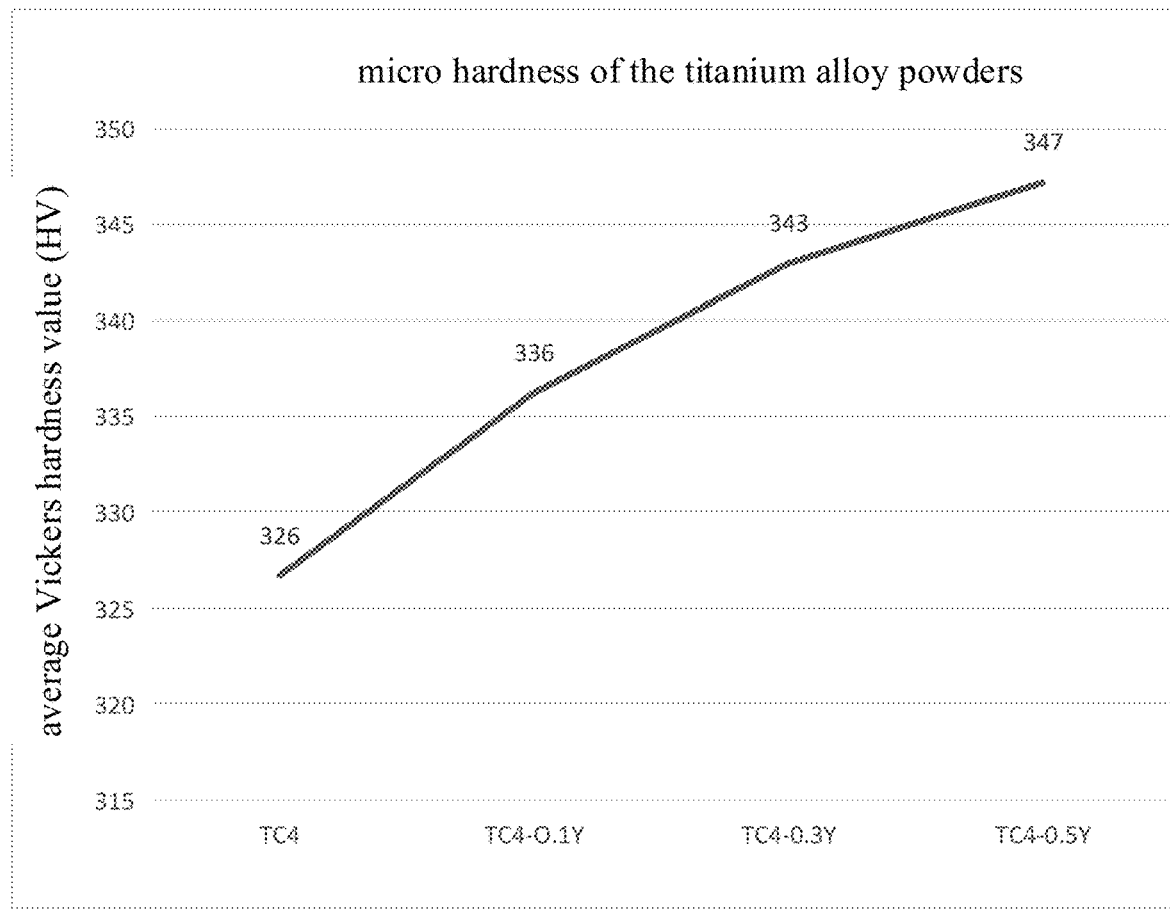
FIG. 3 is a comparative diagram of micro hardness of the titanium alloy powders prepared in embodiments of the present disclosure.

FIG. 3 is a comparative diagram of micro hardness of the titanium alloy powders prepared in the first comparative embodiment, the first embodiment, the second embodiment and the third embodiment of the present disclosure. Which are obtained by micro Vickers hardness testing of titanium alloy powders embedded samples prepared in the embodiments. As shown in FIG. 3, an average Vickers hardness value of the titanium alloy powders embedded samples prepared in the first comparative embodiment is 327 HV, an average Vickers hardness value of the titanium alloy powders embedded sample prepared in the first embodiment is 336 HV, an average Vickers hardness value of the titanium alloy powders embedded sample prepared in the second embodiment is 343 HV, an average Vickers hardness value of the titanium alloy powders embedded sample prepared in the third embodiment is 343 HV.

Figure 4:
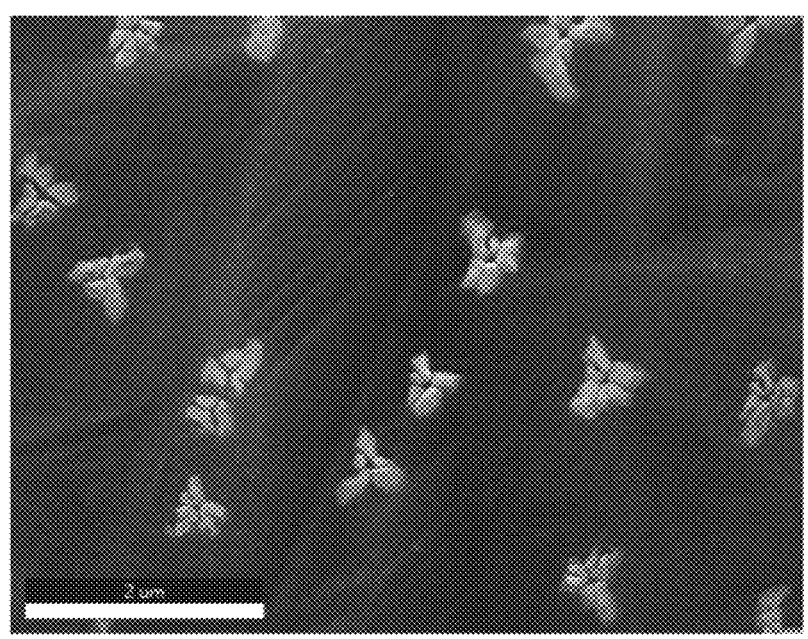
FIG. 4 is a scanning electron microscope (SEM) at 5000× of a diffusion phase of the titanium alloy powders prepared in a third embodiment of the present disclosure.
Figure 5:
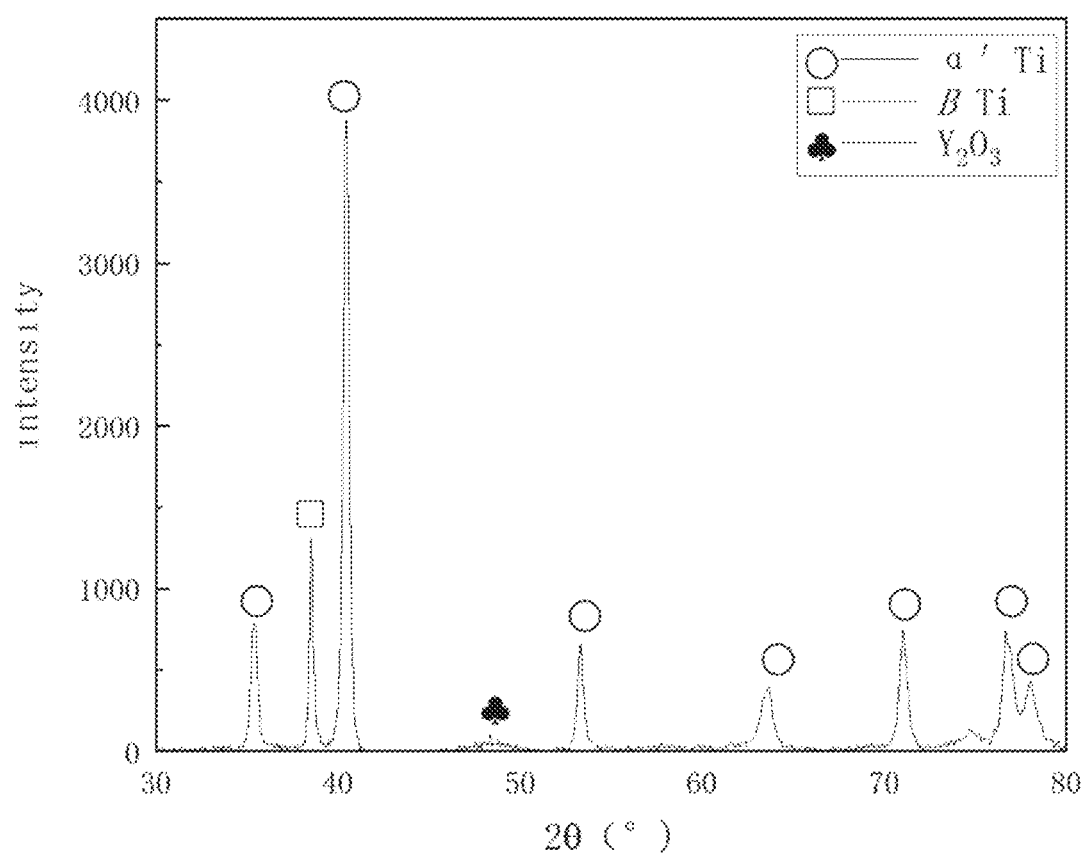
FIG. 5 is an XRD diagram of a diffusion phase of the titanium alloy powders prepared in a third embodiment of the present disclosure.

FIG. 4 is a scanning electron microscope (SEM) at 5000× of a diffusion phase of the titanium alloy powders prepared in a third embodiment of the present disclosure. As shown in FIG. 4, there are nanoscale particles in titanium alloy powders, and an average particle size is around 200 nm, and through point scanning of energy spectrometer found that yttrium content and oxygen content in the dispersion phase is high. FIG. 5 is an XRD diagram of a diffusion phase of the titanium alloy powders prepared in a third embodiment of the present disclosure. As peaks of yttrium oxide was detected, therefore it was determined that the dispersion phase should be yttrium oxide at the nanoscale.

According to a nitrogen and oxygen content analyzer, the oxygen content of the titanium alloy powders in the first comparative embodiment is 490 ppm. The oxygen content of the titanium alloy powders prepared in the first embodiment is 420 ppm, the oxygen content of the titanium alloy powders prepared in the second embodiment is 390 ppm, and the oxygen content of the titanium alloy powders prepared in the third embodiment is 390 ppm.

A particle size and shape of the titanium alloy powders prepared in the first comparative embodiment, the first embodiment, the second embodiment and the third embodiment of the present disclosure were measured by a dynamic image analyzer. A average circularity and an average aspect ratio of the titanium alloy powders prepared in the first comparative embodiment are 0.891 and 0.903, respectively; A average circularity and an average aspect ratio of the titanium alloy powders prepared in the first embodiment are 0.911 and 0.926, respectively; A average circularity and an average aspect ratio of the titanium alloy powders prepared in the second embodiment are 0.914 and 0.934, respectively; A average circularity and an average aspect ratio of the titanium alloy powders prepared in the third embodiment are 0.926 and 0.954, respectively. Recording a flow time of 50 g of titanium alloy powders prepared in the first comparative embodiment, the first embodiment, the second embodiment and the third embodiment of the present disclosure by a Hall flowmeter. The flow time of titanium alloy powders prepared in the first comparative embodiment is 25.1 s, the flow time of titanium alloy powders prepared in the first embodiment is 24.8 s, the flow time of titanium alloy powders prepared in the second embodiment is 24.7 s, the flow time of titanium alloy powders prepared in the third embodiment is 24.1 s. Data of the particle size and shape of the titanium alloy powders are recoded on table 1.

|  | Fluidity (50 g flow time, s) | Average Circularity | Average Aspect Ratio |
|---|---|---|---|
| Ti6Al4V | 25.1 | 0.891 | 0.903 |
| Ti6Al4V-0.1Y | 24.8 | 0.911 | 0.926 |
| Ti6Al4V-0.3Y | 24.7 | 0.914 | 0.934 |
| Ti6Al4V-0.5Y | 24.1 | 0.926 | 0.954 | table 1 Parameters comparison table of particle size and shape of the titanium alloy powders prepared in the first comparative embodiment, the first embodiment, the second embodiment and the third embodiment of the present disclosure.

A Fourth Embodiment

A preparation method of titanium alloy powders, includes following steps:
S1, mixing alloying elements according to alloy element ratios of: 1.0 wt % Y, 5.8 wt % Al, 3.8 wt % V, and Ti as balance, preparing alloy ingots by a vacuum smelting process, and performing a forging and rolling process for the alloy ingots; the Y is powders of simple substance, and a particle size of the Y is not greater than 40 μm;
the vacuum smelting process is performed not less than two times, the temperature of the forging and rolling process is 800° C., the forging and rolling process lasts for 140 min, the deformation degree of the alloy ingots during the forging and rolling process is 30%.
S2, performing a mechanical treatment for the forged and rolled alloy ingots, to obtain alloy rods that meet a size requirement of a plasma rotating electrode process; a length of the alloy rods is 160 mm, a diameter of the ally rods is 30 mm, a surface roughness Ra of the alloy rods is not greater than 1.6 μm.
S3, preparing titanium alloy powders based on the alloy rods by the plasma rotating electrode process, includes:
S31, loading the alloy rods into a rotatable feeding device, vacuuming an atomization chamber until a vacuum degree of the atomization chamber reaches $8.6 \times 10^3$ Pa, and filling an inert gas into the atomization chamber until a pressure of the atomization chamber reaches $1.7 \times 10^{-5}$ Pa, and detecting an oxygen content of the atomization chamber to keep the oxygen content of the atomization chamber not greater than 100 ppm;
S32, starting a cooling system to control a temperature of the inert gas keeps at 400° C.;
S33, starting the rotatable feeding device and a power supply of a plasma gun, to perform an atomizing process, and to obtain the titanium alloy powders, where a plasma arc is generated between the alloy rods and the plasma gun, and under a combining action of a centrifugal force and a surface tension, the alloy rods are melted and changed into droplets, and the droplets are solidified into the titanium alloy powders, after the titanium alloy powders completely cooled down, the titanium alloy powders are vacuum packaged and stored.
preparing parameters of the plasma rotating electrode process are: a rotating speed of the alloy rods is 35000 r/min, a feeding speed of the alloy rods is 2.0 mm/s, a power of the plasma gun is 140 kw, a spindle current of the plasma rotating electrode of the rotating feed device is 700 A, the working current of the plasma gun is 80 A.

A Fifth Embodiment

A preparation method of titanium alloy powders, includes following steps:
S1, mixing alloying elements according to alloy element ratios of: 0.7 wt % Y, 6.2 wt % Al, 4.2 wt % V, and Ti as balance, preparing alloy ingots by a vacuum smelting process, and performing a forging and rolling process for the alloy ingots; the Y is powders of simple substance, and a particle size of the Y is not greater than 40 μm;
the vacuum smelting process is performed not less than two times, the temperature of the forging and rolling process is 1100° C., the forging and rolling process lasts for 80 min, the deformation degree of the alloy ingots during the forging and rolling process is 40%.
S2, performing a mechanical treatment for the forged and rolled alloy ingots, to obtain alloy rods that meet a size requirement of a plasma rotating electrode process; a length of the alloy rods is 160 mm, a diameter of the ally rods is 30 mm, a surface roughness Ra of the alloy rods is not greater than 1.6 μm.
S3, preparing titanium alloy powders based on the alloy rods by the plasma rotating electrode process, includes:
S31, loading the alloy rods into a rotatable feeding device, vacuuming an atomization chamber until a vacuum degree of the atomization chamber reaches $8.6 \times 10^{-3}$ Pa, and filling an inert gas into the atomization chamber until a pressure of the atomization chamber reaches $1.7 \times 10^{-5}$ Pa, and detecting an oxygen content of the atomization chamber to keep the oxygen content of the atomization chamber not greater than 100 ppm;
S32, starting a cooling system to control a temperature of the inert gas keeps at 200° C.;
S33, starting the rotatable feeding device and a power supply of a plasma gun, to perform an atomizing process, and to obtain the titanium alloy powders, where a plasma arc is generated between the alloy rods and the plasma gun, and under a combining action of a centrifugal force and a surface tension, the alloy rods are melted and changed into droplets, and the droplets are solidified into the titanium alloy powders, after the titanium alloy powders completely cooled down, the titanium alloy powders are vacuum packaged and stored.
preparing parameters of the plasma rotating electrode process are: a rotating speed of the alloy rods is 25000 r/min, a feeding speed of the alloy rods is 1.0 mm/s, a power of the plasma gun is 60 kw, a spindle current of the plasma rotating electrode of the rotating feed device is 800 A, the working current of the plasma gun is 120 A.

A Sixth Embodiment

The technical solutions of the second embodiment is basically the same as that of the fifth embodiment, with the only difference being that alloy element ratios of alloying elements are as follow: 0.4 wt % Y, 5.5 wt % Al, 4.5 wt % V, and Ti as balance.

A Seventh Embodiment

The technical solutions of the third embodiment is basically the same as that of the fifth embodiment, with the only difference being that alloy element ratios of alloying elements are as follow: 0.4 wt % Y, 6.8 wt % Al, 3.5 wt % V, and Ti as balance.

A Eighth Embodiment

A preparation method of titanium alloy powders, includes following steps:
S1, mixing alloying elements according to alloy element ratios of: 0.293 wt % Y, 5.74 wt % Al, 3.74 wt % V, and Ti as balance, preparing alloy ingots by a vacuum smelting process, and performing a forging and rolling process for the alloy ingots; the Y is powders of simple substance, and a particle size of the Y is not greater than 40 μm;
the vacuum smelting process is performed not less than two times, the temperature of the forging and rolling process is 900° C., the forging and rolling process lasts for 130 min, the deformation degree of the alloy ingots during the forging and rolling process is 40%.
S2, performing a mechanical treatment for the forged and rolled alloy ingots, to obtain alloy rods that meet a size requirement of a plasma rotating electrode process; a length of the alloy rods is 150 mm, a diameter of the ally rods is 30 mm, a surface roughness Ra of the alloy rods is not greater than 1.6 μm.
S3, preparing titanium alloy powders based on the alloy rods by the plasma rotating electrode process, includes:
S31, loading the alloy rods into a rotatable feeding device, vacuuming an atomization chamber until a vacuum degree of the atomization chamber reaches $1.0 \times 10^{-3}$ Pa, and filling an inert gas into the atomization chamber until a pressure of the atomization chamber reaches $1.8 \times 10^5$ Pa, and detecting an oxygen content of the atomization chamber to keep the oxygen content of the atomization chamber not greater than 100 ppm;
S32, starting a cooling system to control a temperature of the inert gas keeps at 350° C.;
S33, starting the rotatable feeding device and a power supply of a plasma gun, to perform an atomizing process, and to obtain the titanium alloy powders, where a plasma arc is generated between the alloy rods and the plasma gun, and under a combining action of a centrifugal force and a surface tension, the alloy rods are melted and changed into droplets, and the droplets are solidified into the titanium alloy powders, after the titanium alloy powders completely cooled down, the titanium alloy powders are vacuum packaged and stored.

Preparing parameters of the plasma rotating electrode process are: a rotating speed of the alloy rods is 32000 r/min, a feeding speed of the alloy rods is 1.9 mm/s, a power of the plasma gun is 90 kw, a spindle current of the plasma rotating electrode of the rotating feed device is 650 A, the working current of the plasma gun is 110 A.

A Ninth Embodiment

A preparation method of titanium alloy powders, includes following steps:
S1, mixing alloying elements according to alloy element ratios of: 0.477 wt % Y, 6.15 wt % Al, 4.11 wt % V, and Ti as balance, preparing alloy ingots by a vacuum smelting process, and performing a forging and rolling process for the alloy ingots; the Y is powders of simple substance, and a particle size of the Y is not greater than 40 μm;
the vacuum smelting process is performed not less than two times, the temperature of the forging and rolling process is 1000° C., the forging and rolling process lasts for 130 min, the deformation degree of the alloy ingots during the forging and rolling process is 40%.
S2, performing a mechanical treatment for the forged and rolled alloy ingots, to obtain alloy rods that meet a size requirement of a plasma rotating electrode process; a length of the alloy rods is 200 mm, a diameter of the ally rods is 30 mm, a surface roughness Ra of the alloy rods is not greater than 1.6 μm.
S3, preparing titanium alloy powders based on the alloy rods by the plasma rotating electrode process, includes:
S31, loading the alloy rods into a rotatable feeding device, vacuuming an atomization chamber until a vacuum degree of the atomization chamber reaches $1.0 \times 10^{-3}$ Pa, and filling an inert gas into the atomization chamber until a pressure of the atomization chamber reaches $1.5 \times 10^5$ Pa, and detecting an oxygen content of the atomization chamber to keep the oxygen content of the atomization chamber not greater than 80 ppm;
S32, starting a cooling system to control a temperature of the inert gas keeps at 240° C.;
S33, starting the rotatable feeding device and a power supply of a plasma gun, to perform an atomizing process, and to obtain the titanium alloy powders, where a plasma arc is generated between the alloy rods and the plasma gun, and under a combining action of a centrifugal force and a surface tension, the alloy rods are melted and changed into droplets, and the droplets are solidified into the titanium alloy powders, after the titanium alloy powders completely cooled down, the titanium alloy powders are vacuum packaged and stored.

Preparing parameters of the plasma rotating electrode process are: a rotating speed of the alloy rods is 28000 r/min, a feeding speed of the alloy rods is 1.1 mm/s, a power of the plasma gun is 110 kw, a spindle current of the plasma rotating electrode of the rotating feed device is 750 A, the working current of the plasma gun is 90 A.

The invention claimed is:
1. A preparation method of titanium alloy powders, comprising the following steps:
mixing alloying elements according to alloy element ratios of: 0.1 wt % to 1.0 wt % Y, 5.5 wt % to 6.8 wt % Al, 3.5 wt % to 4.5 wt % V, and Ti as balance, preparing alloy ingots by a vacuum smelting process, and performing a forging and rolling process for the alloy ingots to obtain forged and rolled alloy ingots, where, a temperature of the forging and rolling process is 800° C. to 1100° C., the forging and rolling process lasts for 80 min to 140 min, and a deformation degree of the alloy ingots during the forging and rolling process is 30% to 50%;
performing a mechanical treatment for the forged and rolled alloy ingots, to obtain alloy rods that meet a size requirement of a plasma rotating electrode process;
preparing titanium alloy powders based on the alloy rods by the plasma rotating electrode process;

where the step of preparing titanium alloy powders based on the alloy rods by the plasma rotating electrode process comprises:

loading the alloy rods into a rotatable feeding device, vacuuming an atomization chamber until a vacuum degree of the atomization chamber reaches $1 \times 10^{-3}$ Pa to $1 \times 10^{-2}$ Pa, and filling an inert gas into the atomization chamber until a pressure of the atomization chamber reaches $1.6 \times 10^5$ Pa to $1.8 \times 10^5$ Pa, and keeping an oxygen content of the atomization chamber at a level not greater than 100 ppm;

starting a cooling system to control a temperature of the inert gas within 200° C. to 400° C.;

starting the rotatable feeding device and a power supply of a plasma gun to perform an atomizing process and to obtain the titanium alloy powders, where a plasma arc is generated between the alloy rods and the plasma gun, and under a combined action of a centrifugal force and a surface tension, the alloy rods are melted and changed into droplets, and the droplets are solidified into the titanium alloy powders;

after the titanium alloy powders completely cool down, the titanium alloy powders are vacuum packaged and stored;

preparing parameters are: a rotating speed of the alloy rods is 25000 r/min to 35000 r/min, a feeding speed of the alloy rods is 1.0 mm/s to 2.0 mm/s, a power of the plasma gun is 60 kw to 140 kw, the inert gas serves as a protective gas during a powder making process, a spindle current of the plasma rotating electrode of the rotating feed device is 600 A to 800 A, and a working current of the plasma gun is 80 A to 120 A.

2. The preparation method of titanium alloy powders according to claim 1, wherein, mixing alloying elements according to the alloy element ratios of: 0.3 wt % to 0.5 wt % Y; 5 wt % to 6.2 wt % Al; 3.8 wt % to 4.2 wt % V, and Ti as balance, preparing the alloy ingots by the vacuum smelting process, and performing the forging and rolling process for the alloy ingots.

3. The preparation method of titanium alloy powders according to claim 1, wherein mixing alloying elements comprises mixing the Y in the form of powders having a particle size not greater than 40 um.

4. The preparation method of titanium alloy powders according to claim 1, wherein, the vacuum smelting process is a vacuum arc self-consuming smelting process, or
   the vacuum smelting process is a vacuum induction melting process;
   the vacuum smelting process is performed not less than two times.

5. The preparation method of titanium alloy powders according to claim 1, wherein, a length of the alloy rods is 150 mm to 200 mm, a diameter of the ally rods is 30 mm, and a surface roughness of the alloy rods is not greater than 1.6 μm.

6. The preparation method of titanium alloy powders according to claim 1, wherein, the preparing parameters of the plasma rotating electrode process are: the rotating speed of the alloy rods of 30000 r/min to 35000 r/min, the feeding speed of the alloy rods is 1.5 mm/s to 2.0 mm/s, and the power of the plasma gun is 100 kw to 120 kw.

7. The preparation method of titanium alloy powders according to claim 6, wherein the titanium alloy powders comprise Yttrium oxide dispersed and strengthened titanium alloy powders, and during the plasma rotating electrode process, the temperature of the inert gas is 200° C. to 280° C.; and the oxygen content of the atomization chamber is not greater than 50 ppm.

8. The preparation method of titanium alloy powders according to claim 1, wherein, the spindle current of the plasma rotating electrode of the rotating feed device is 600 A to 700 A, and the working current of the plasma gun is 100 A to 120 A.

* * * * *